United States Patent
Nerling et al.

(10) Patent No.: US 10,493,582 B2
(45) Date of Patent: Dec. 3, 2019

(54) DEVICE AND METHOD FOR COOLING WORKPIECES

(71) Applicant: CARL ZEISS 3D AUTOMATION GMBH, Aalen (DE)

(72) Inventors: Olaf Nerling, Dagersheim (DE); Thomas Frankenfeld, Schwaebisch Gmuend (DE); Markus Nagler, Unterschneidheim (DE); Marius Sauter, Aalen (DE)

(73) Assignee: CARL ZEISS 3D AUTOMATION GMBH, Aalen (DE)

( * ) Notice: Subject to any disclaimer, the term of this patent is extended or adjusted under 35 U.S.C. 154(b) by 332 days.

(21) Appl. No.: 15/484,265

(22) Filed: Apr. 11, 2017

(65) Prior Publication Data
US 2017/0297158 A1 Oct. 19, 2017

(30) Foreign Application Priority Data
Apr. 18, 2016 (DE) .................. 10 2016 107 168

(51) Int. Cl.
*G01K 7/00* (2006.01)
*G01K 1/00* (2006.01)
*B23Q 11/10* (2006.01)

(52) U.S. Cl.
CPC .................. *B23Q 11/10* (2013.01)

(58) Field of Classification Search
USPC .................................. 374/163, 141
See application file for complete search history.

(56) References Cited

U.S. PATENT DOCUMENTS

| 4,857,694 A * | 8/1989 | Doyle | B23K 37/003 219/76.12 |
| 4,895,454 A * | 1/1990 | Kammleiter | B23Q 41/00 33/702 |
| 6,675,549 B1 * | 1/2004 | Kaneda | B23Q 11/10 409/135 |
| 2003/0021329 A1 * | 1/2003 | El-Gabry | G01N 25/18 374/43 |
| 2003/0024269 A1 * | 2/2003 | Shepard | C03B 27/00 65/29.18 |
| 2008/0198900 A1 * | 8/2008 | Myhre | B22D 11/225 374/179 |

FOREIGN PATENT DOCUMENTS

| CA | 1336104 C | 6/1995 |
| DE | 3729644 A1 | 3/1989 |
| DE | 4039336 A1 | 6/1992 |
| DE | 68904980 T2 | 6/1993 |

(Continued)

*Primary Examiner* — Mirellys Jagan
(74) *Attorney, Agent, or Firm* — Harness, Dickey & Pierce, P.L.C.

(57) ABSTRACT

The invention relates to a device for cooling workpieces. The device has at least one nozzle which is configured to blow a fluid onto a workpiece. At least one surface temperature sensor is able to be arranged on the workpiece. In order to cool the workpiece, it is blown with a fluid by means of the at least one nozzle, the temperature of said fluid being lower than the surface temperature of the workpiece. In the process, the surface temperature is monitored by means of the at least one surface temperature sensor.

9 Claims, 3 Drawing Sheets

(56) References Cited

FOREIGN PATENT DOCUMENTS

| DE | 102004013361 A1 | 10/2005 |
|----|-----------------|---------|
| DE | 60110713 T2 | 2/2006 |
| DE | 102009031018 B4 | 9/2013 |
| DE | 102014101874 A1 | 8/2015 |
| DE | 102016100613 A1 | 7/2016 |

* cited by examiner

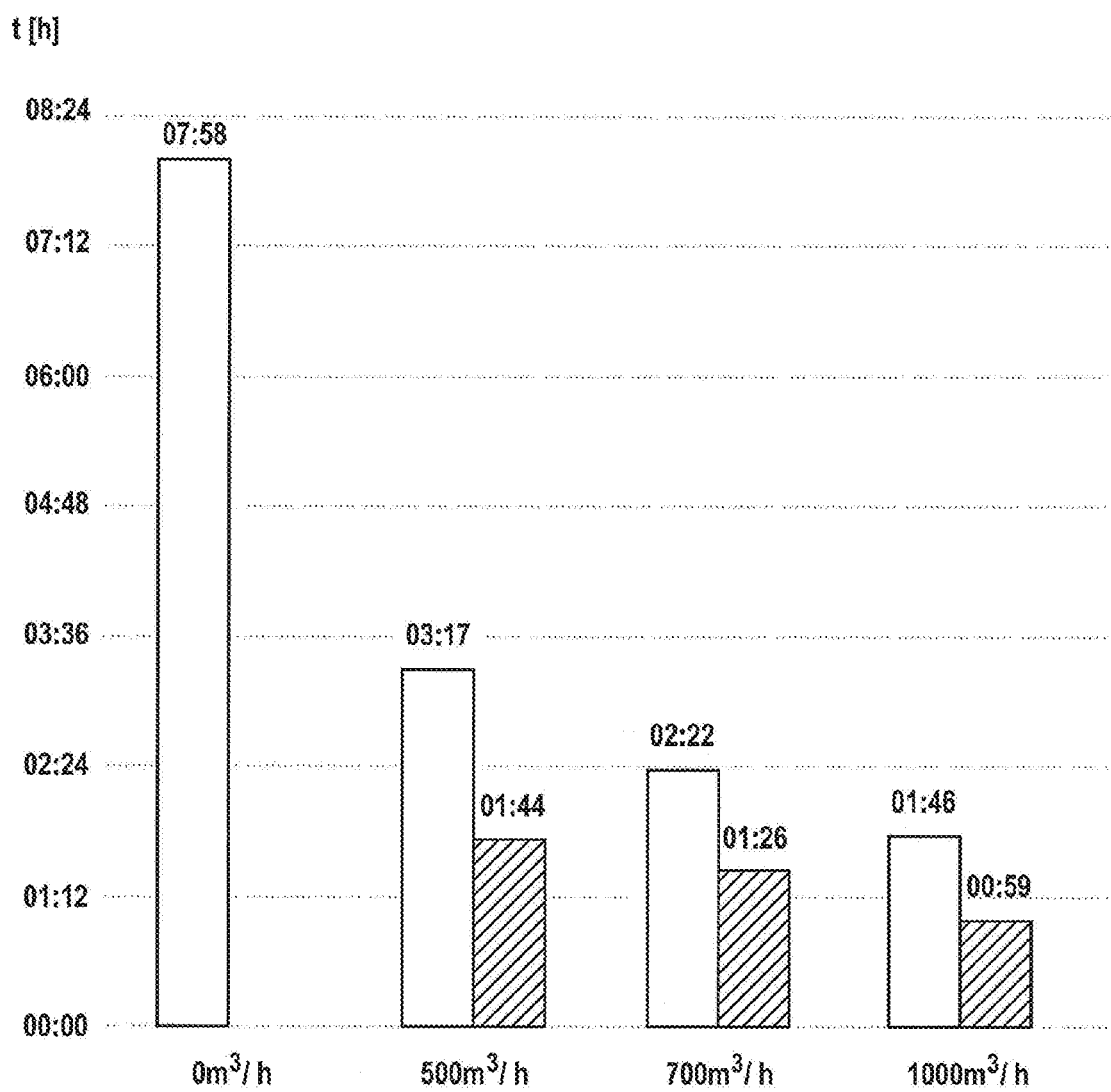

DEVICE AND METHOD FOR COOLING WORKPIECES

CROSS-REFERENCES TO RELATED APPLICATIONS

This application claims priority from German patent application DE 10 2016 107 168.4, filed on Apr. 18, 2016. The entire content of this prior application is incorporated herein by reference.

The present invention relates to a device for cooling workpieces. It also relates to a method for cooling workpieces, which can make use of the device.

BACKGROUND OF THE INVENTION

In order for it to be possible to machine workpieces with micrometre accuracy, for example on a machining centre, said workpieces, because of material expansion as a result of a change in temperature before machining, have to be brought to the defined basic temperature of the machine before a machining process can be started. Before the workpiece is analysed, too, for example before the measurement with micrometre accuracy on a coordinate measuring machine for potential adaptation of machine tools, it has to be brought to a defined basic temperature of the machine.

Nowadays, the workpieces, which frequently come from pre-machining processes, for example cleaning, at temperatures of up to 60° C., are introduced into the facilities for further processing or into upstream rooms at the same temperature and are stored there, depending on component size, wall thickness and material, for up to 24 hours until they are processed further. In the course of this, the workpieces gradually consistently take on the defined temperature of the environment.

However, this causes a time delay between the pre-machining process and the machining process or measurement. Production release can only take place after temperature equalization has been ensured. Otherwise, there is the risk of rejects being produced in the time until the measurement result is available. Furthermore, there is a large space requirement for storing the cooling workpieces. Moreover, these are not available for further machining steps until they have cooled fully.

Therefore, it is an object of the present invention to provide a device and a method which allow more rapid cooling of workpieces.

SUMMARY OF THE INVENTION

This object is achieved by the device according to the invention for cooling workpieces. Said device has at least one nozzle which is configured to blow a fluid onto a workpiece. Furthermore, it has at least one surface temperature sensor, or surface temperature probe, which is able to be arranged on the workpiece.

The object is also achieved by the method according to the invention for cooling workpieces. In said method, a workpiece is blown with a fluid by means of at least one nozzle, the temperature of said fluid being lower than the surface temperature of the workpiece, in particular lower than the surface temperature in the region targeted by the nozzle. As a result, the workpiece cools more quickly than would be possible in a conventional cooling operation by way of heat exchange with the environment. The surface temperature is monitored by means of at least one surface temperature sensor. In this way, it is possible to determine when the surface temperature corresponds to the desired target temperature of the cooling operation.

The device is preferably arranged in an air-conditioned room and the method is preferably carried out in the air-conditioned room. As a result, an ambient temperature can be predetermined, which serves as the target temperature of the cooling operation. Furthermore, the air-conditioning prevents a layer of heated air forming at the workpiece surface during the cooling of the workpiece, which layer would slow down the rest of the cooling operation.

In principle, any medium can be used as fluid, which can be blown onto the workpiece at a high medium speed. However, use is preferably made of air, since this can be taken easily from the environment of the workpiece.

Blowing preferably takes place at a blowing speed of at least 0.3 m/sec, more preferably at least 0.5 m/sec, most preferably at least 1.0 m/sec.

In one preferred embodiment of the device, the at least one nozzle is configured to take air as fluid from an air-conditioned room. This air is already at the target temperature of the cooling operation. If, in one embodiment of the method, air is taken as fluid from the air-conditioned room using such a device, the blowing of the workpiece is preferably continued for a predeterminable period of time after the surface temperature thereof has reached the ambient temperature thereof. This ensures that it is not just the surface of the workpiece that reaches the target temperature of the cooling operation, but the entire workpiece. By contrast, immediate ending of the blowing after the surface temperature has reached the ambient temperature for the first time would result in the surface temperature rising above the ambient temperature again, since the workpiece surface would be heated again by the warmer workpiece body.

In another preferred embodiment of the device, the at least one nozzle is configured to take air as fluid from a cold-air source of the air-conditioned room. Such a cold-air source is usually arranged in the ceiling of the air-conditioned room and cools air which has been taken from the room to below the current temperature of the room there. Cold air is thus understood to be air, the temperature of which is below the temperature inside the air-conditioned room. Since the air cooled in this way is passed back into the room, the temperature thereof can be lowered. If, in one embodiment of the method, a workpiece is blown using such a device, the blowing of the workpiece is preferably continued until the surface temperature thereof has dropped below the ambient temperature thereof. A period of time is subsequently allowed until the surface temperature has risen to the ambient temperature. Further blowing onto the workpiece can then take place, wherein, for this purpose, use is now made of air which is taken from the air-conditioned room and is thus at the target temperature of the cooling operation. In this case, use is made of the fact that the air of the cold-air source, the temperature of which is below the ambient temperature in the air-conditioned room, allows rapid cooling of the workpiece surface to below this ambient temperature. Subsequently, on account of its still relatively high core temperature, the surface temperature of the workpiece equalizes rapidly with the ambient temperature. This procedure allows even quicker cooling of the workpiece than can be achieved simply by blowing with air at ambient temperature.

Even if the surface temperature of the workpiece could in principle be measured contactlessly, the at least one surface temperature sensor is in particular a surface contact temperature sensor.

In one preferred embodiment, the device has at least one movable arm which is configured to move a surface temperature sensor up to the workpiece. In particular, it has several arms of this kind. This makes it possible to move several surface temperature sensors up to different positions on relatively large workpieces, in order in this way to reliably test whether the temperature of the entire surface has reached the target temperature.

In another preferred embodiment, the device has at least one data line which is configured to be connected to a surface temperature sensor which is arranged on the workpiece. A data line is understood here to include a wireless data link, for example by radio. This makes it possible to leave the surface temperature sensor on the workpiece after the end of cooling, in that only the data line is separated from the surface temperature sensor. Upon subsequent analysis of the workpiece, the surface temperature sensor can then be used again.

The air-conditioned room is preferably an air-conditioning tunnel. As such, it can connect a production facility for the workpiece to an analysis system for the workpiece. The analysis system is in particular a measuring unit and can contain for example a coordinate measuring machine. The workpiece can then be cooled in the air-conditioning tunnel after being produced, and subsequently be transported onwards therein into an analysis system and analysed in the latter. This allows continuous production of workpieces.

BRIEF DESCRIPTION OF THE DRAWINGS

Exemplary embodiments of the invention are illustrated in the drawings and explained in more detail in the following description.

FIG. 5 shows a chart of cooling times of workpieces in a conventional cooling operation and according to various exemplary embodiments of the method according to the invention.

DETAILED DESCRIPTION OF THE PREFERRED EMBODIMENTS

Figure 1:
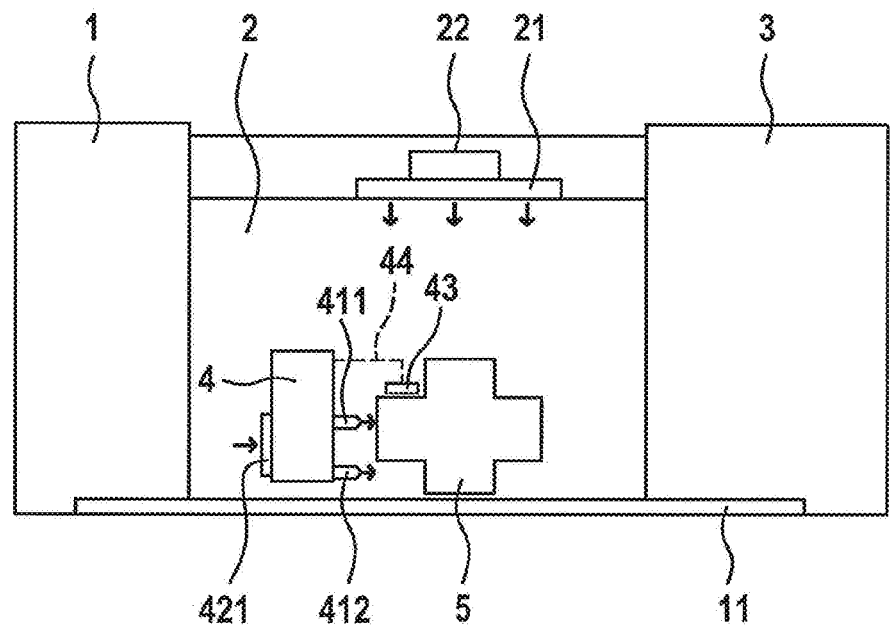
FIG. 1 shows a schematic side view of a device according to a first exemplary embodiment of the invention.

A device for cooling workpieces according to a first exemplary embodiment of the invention is illustrated in FIG. 1. A production facility 1, which is embodied as a machining centre, has a passage into an air-conditioned room 2 which is in the form of an air-conditioning tunnel. Via a ceiling inlet 21, air cooled to 17° C. by a cold-air source 22 is passed into the air-conditioned room 2 in order to lower the internal temperature thereof to a predetermined value of 20° C. The air-conditioned room 2 is connected to a likewise air-conditioned analysis system 3 which in the present case contains a coordinate measuring machine. The device 4 is arranged in the air-conditioned room 2. A conveyor belt 11 can transport workpieces 5 from the production facility 1, through the air-conditioned room 2 and into the analysis system 3. In this case, the workpieces 5 are at a temperature in the range of 55° C. to 60° C. when they leave the production facility 1. Before they are transported onwards into the analysis system 3, they are cooled to 20° C. in the air-conditioned room 2.

The device 4 has two nozzles 411, 412. Air is drawn in from the air-conditioned room 2 through an intake opening 421. A workpiece 5 is blown with this air at a temperature of 20° C. by means of the nozzles 411, 412. A surface temperature sensor 43, which is embodied as a contact temperature sensor, is already fastened to the surface of the workpiece 5 in the production facility 1. It is connected to the device 4 by means of a data line 44 in the air-conditioned room 2. The nozzles 411, 412 blow the workpiece 5 with air until the surface temperature sensor 43 measures a surface temperature of 20° C. for a predetermined period of time. This predetermined period of time was calculated empirically for the workpiece 5. Then, the data line 44 is removed and the workpiece is transported onwards into the analysis system 3 for measurement. During measurement, the surface temperature of the workpiece is again determined by means of the surface temperature sensor 43, which to this end is connected to the coordinate measuring machine. If deviations from the desired dimensions are determined in the process, a machine tool in the production facility can be adapted in order to avoid the deviations when the next workpieces are produced.

Figure 2:
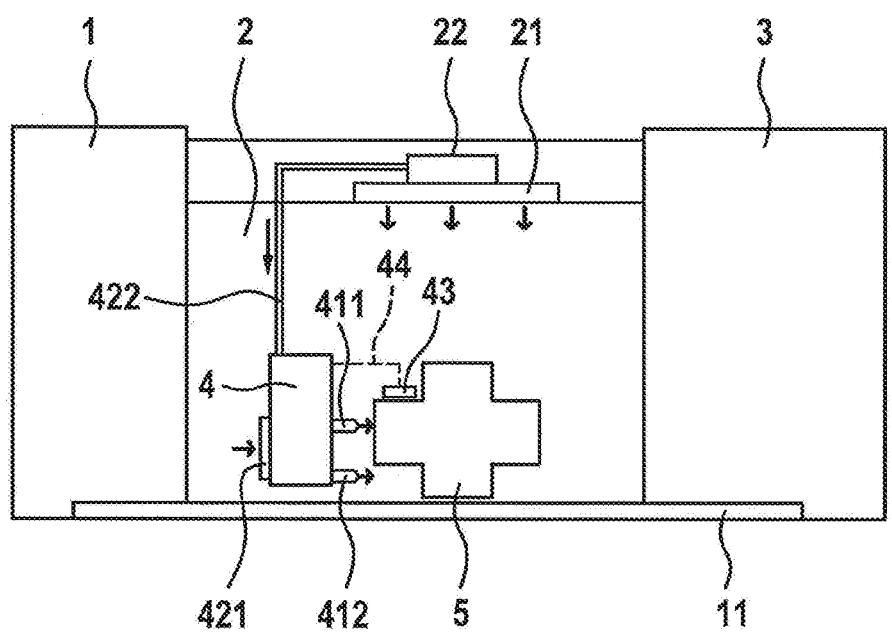
FIG. 2 shows a schematic side view of a device according to a second exemplary embodiment of the invention.

A device 4 for cooling workpieces according to a second exemplary embodiment of the invention is illustrated in FIG. 2. It differs from the device 4 according to the first exemplary embodiment in that it has a connection line 422 to the cold-air source 22. The nozzles 411, 412 can be supplied with air either by means of the intake opening 421 or by means of the connection line 422. The cooling operation differs from the cooling operation in the first exemplary embodiment in that the surface of the workpiece 5 is first of all cooled to a temperature of 17° C. with air from the connection line 422. Subsequently, the workpiece is blown again with air at a temperature of 20° C. from the intake opening 421, until the surface of the workpiece 5 has reached a temperature of 20° C. Then, blowing is interrupted without further delay, the data line 44 is removed and the workpiece is transported onwards into the analysis system 3 for measurement.

Figure 3:
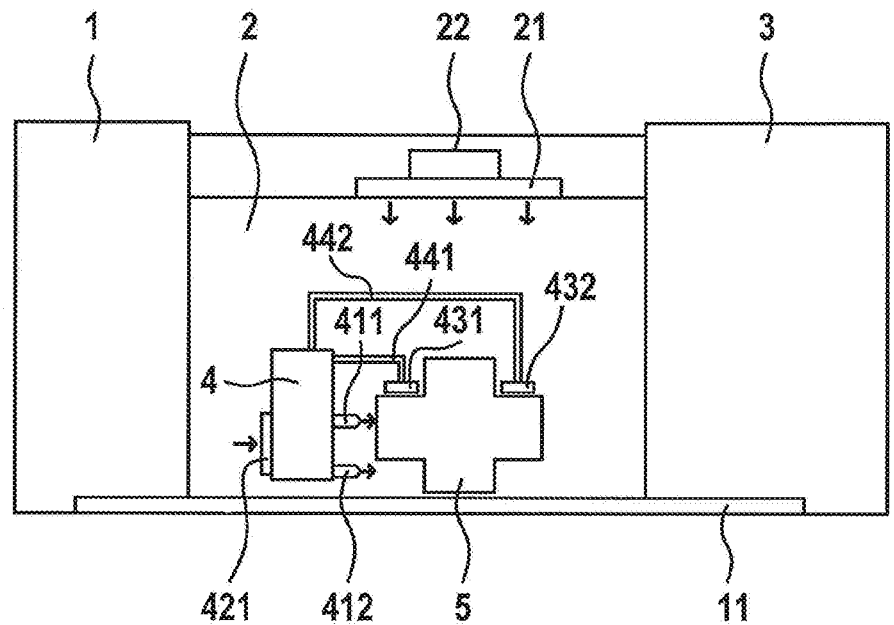
FIG. 3 shows a schematic side view of a device according to a third exemplary embodiment of the invention.

A device 4 for cooling workpieces according to a third exemplary embodiment of the invention is illustrated in FIG. 3. It differs from the device 4 according to the first exemplary embodiment in that it has two surface temperature sensors 431, 432. These are not already attached to the workpiece 5 in the production facility 1. They also do not remain on the workpiece 5 after the air-conditioned room 2 has been left. Rather, each surface temperature sensor 431, 432 is arranged at the end of an arm 441, 442. By means of the arms 441, 442, the surface temperature sensors 431, 432 are moved up to different positions on the surface of the workpiece 5 before blowing is started. After blowing is finished, they are removed from the workpiece 5 again by means of the arms 441, 442.

Figure 4:
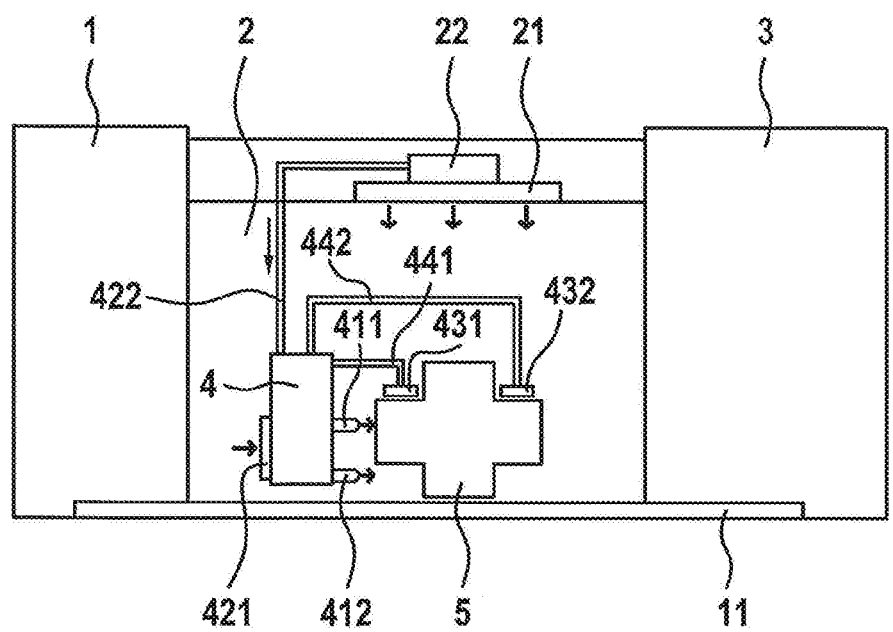
FIG. 4 shows a schematic side view of a device according to a fourth exemplary embodiment of the invention.

As illustrated in FIG. 4, in a fourth exemplary embodiment of the invention, a connection line 422 between the device 4 and the cold-air source 22 can also be provided when the surface temperature sensors 431, 432 of the third exemplary embodiment are used.

FIG. 5 illustrates a bar chart showing how long it takes for an aluminium cylinder head leaving the production facility 1 as workpiece 5 at a temperature of 60° C. to be cooled to a temperature of 20° C. given different volumetric flow rates of the blowing. In a comparative example, in which blowing is omitted, the cooling lasts for a period t of 7 hours and 58 minutes. Illustrated alongside is how blowing with air at a temperature of 20° C. and a volumetric flow rate of 500 m³/h, 700 m³/h and 1000 m³/h by means of a device according to the first or the third exemplary embodiment shortens the cooling time. In this case, a volumetric flow rate of 500 m³/h corresponds to a blowing speed of 0.3 m/sec, a volumetric flow rate of 700 m³/h corresponds to a blowing speed of 0.5 m/sec and a volumetric flow rate of 1000 m³/h corresponds to a blowing speed of 1.0 m/sec. How long it takes until the surface temperature of 20° C. is reached for the first time is specified in each case. Further blowing over the empirically calculated predetermined period is not contained in the specified period t. Further shortening of the cooling time can be achieved in that, by means of a device according to the second or fourth exemplary embodiment, first of all blowing with air at a temperature of 17° C. and then further blowing with air at a temperature of 20° C. takes place. This is illustrated by hatched bars in FIG. 5. How long it takes until the surface temperature of 20° C. is reached for the first time is specified in each case here, too. Further blowing with air at a temperature of 20° C. is not contained in the specified period t. It can be seen that, by means of the devices according to the first or third exemplary embodiment, the cooling time can be shortened considerably. Even more pronounced shortening of the cooling time takes place by means of a device according to the second or fourth exemplary embodiment, in that the workpiece 5 is first of all cooled to below the desired target temperature in order subsequently to be warmed up thereto.

The invention claimed is:

1. A method for cooling workpieces, wherein a workpiece arranged in an air-conditioned room is blown with air taken from the room by means of at least one nozzle, the temperature of said air being lower than a surface temperature of the workpiece, wherein the surface temperature is monitored by means of at least one surface temperature sensor, and further wherein the blowing of the workpiece is continued for a predeterminable period of time after the surface temperature thereof has reached the temperature of the room.

2. The method according to claim 1, characterized in that the workpiece is cooled in an air-conditioning tunnel and is subsequently transported onwards into an analysis system and analyzed in the analysis system.

3. The method according to claim 2, characterized in that, during the analysis, at least one surface temperature sensor is used, which was also used for monitoring the surface temperature during the cooling of the workpiece.

4. The method according to claim 1, characterized in that the at least one nozzle and the at least one surface temperature sensor are parts of a device for cooling workpieces.

5. The method according to claim 4, characterized in that the room is an air-conditioning tunnel, which connects a production facility for the workpiece to an analysis system for the workpiece.

6. The method according to claim 5, characterized in that the analysis system is a measuring unit.

7. The method according to claim 4, characterized in that the at least one surface temperature sensor is a surface contact temperature sensor.

8. The method according to claim 7, characterized in that a movable arm is configured to move the surface contact temperature sensor up to the workpiece.

9. The method according to claim 7, characterized in that at least one data line is connected to the surface contact temperature sensor.

* * * * *